Figure 2:
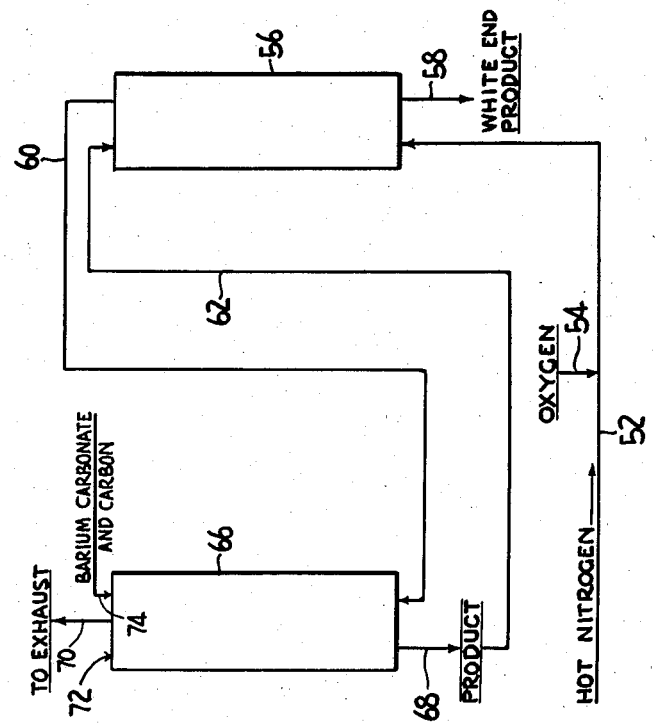

March 3, 1959    H. W. RAHN ET AL    2,876,073
PREPARATION OF BARIUM OXIDE
Filed July 2, 1956

INVENTORS
HENRY W. RAHN and
CHARLES J. SINDLINGER
BY
Oscar L. Spencer
ATTORNEY

United States Patent Office 2,876,073
Patented Mar. 3, 1959

2,876,073

PREPARATION OF BARIUM OXIDE

Henry W. Rahn, Pittsburgh, Pa., and Charles J. Sindlinger, Corpus Christi, Tex., assignors to Columbia-Southern Chemical Corporation, Allegheny County, Pa.

Application July 2, 1956, Serial No. 595,391

9 Claims. (Cl. 23—186)

This invention relates to a novel method of purifying barium oxide. It is known that barium oxide may be prepared by calcination of barium carbonate. Because of the exceedingly high temperature at which barium carbonate calcines, it is common practice to effect calcination of the barium carbonate in the presence of a substantial amount of carbon according to the equation: $BaCO_3 + C \rightarrow BaO + 2CO$. This calcination usually is accompanied by fusion problems which may be minimized by the presence of larger amounts of carbon. However, any excess or unreacted carbon remains in the barium oxide after calcination.

For many purposes this carbon is objectionable. Barium oxide, in its pure state, is a white material. On the other hand, because of substantial contamination of the barium oxide with carbon, the usual barium oxide which is produced by a calcination process is black or at least dark in color.

The removal of carbon is a difficult process. If one attempts to burn the carbon out with ordinary air, the effect is to generate carbon dioxide which then immediately reacts with barium oxide, thereby regenerating barium carbonate. Where large amounts of carbon are present, this regeneration of barium carbonate may become so serious as to make the process essentially unfeasible.

According to the practice of the present invention, a method has been provided whereby barium oxide in high concentration can be prepared as an essentially white product. Furthermore, it has been found that the removal of carbon may be effected without objectionable reduction in the barium oxide content of the resulting product.

According to this invention it has been found that carbon may be removed from a mixture of barium oxide and carbon, such as is obtained by calcination of a mixture of barium carbonate and carbon, particularly a mixture containing above 70 percent by weight BaO as barium oxide and 0.25 to 5 percent carbon by weight, by heating the mixture at an elevated temperature in a stream of an inert gas which contains a small amount of water vapor. Normally this amount of water vapor should be quite small, usually below 5 percent by volume, in order to avoid undue sintering or fusion of the product during the treatment. As a consequence, the carbon apparently is removed substantially according to the equation: $H_2O + C \rightarrow H_2 + CO$. The temperature at which this treatment is effected normally is in the range of 1000–2000° F. However, higher temperatures may be used if desired. Small amounts of oxygen (rarely above 5 percent by volume) may be present in the inert gas. However, this amount should not be so great as to permit formation of substantial $CO_2$ and consequent production of barium carbonate.

The present process normally is conducted in connection with or as an adjunct to a calcination process. Consequently, the barium carbonate normally is calcined in admixture with carbon until a product containing in excess of 85 to 90 percent barium oxide is produced. Thereafter, after calcination is complete, the barium oxide-carbon mixture thus obtained is heated in the presence of water vapor, as described above, in order to whiten the product and to remove the carbon therefrom.

The calcination of the barium carbonate conveniently can be effected according to the methods described in copending applications of Henry W. Rahn and Charles J. Sindlinger, Serial No. 279,786, filed April 1, 1952, now issued into United States Letters Patent No. 2,772,950, granted December 4, 1956, and Serial No. 514,562, filed June 10, 1955, which has issued into United States Letters Patent No. 2,772,948, granted December 4, 1956.

In the practice of a typical embodiment of such a process, the barium carbonate is mixed with 6 to 8 percent or more of carbon by weight, based upon the weight of the barium carbonate, and the mixture is formed in granules having a particle size usually ranging from about 10 to 80 mesh. The granules are then calcined in a fluidized bed by establishing a bed consisting essentially wholly of previously calcined barium oxide granules in an upwardly flowing stream of nitrogen, heating the bed to calcination temperature normally in the range of 825 to 1050° C., and adding the barium carbonate-carbon granules to the barium oxide fluidized bed. As a consequence, the calcination takes place and the barium oxide granules which are withdrawn therefrom normally contain in excess of 70 percent barium oxide, frequently being in excess of 90 percent barium oxide. Thereafter, the barium oxide granules are again heated, according to the present invention, in a stream of inert gas containing small amounts of moisture or water vapor in order to effect the whitening operation herein contemplated.

Figure 1:
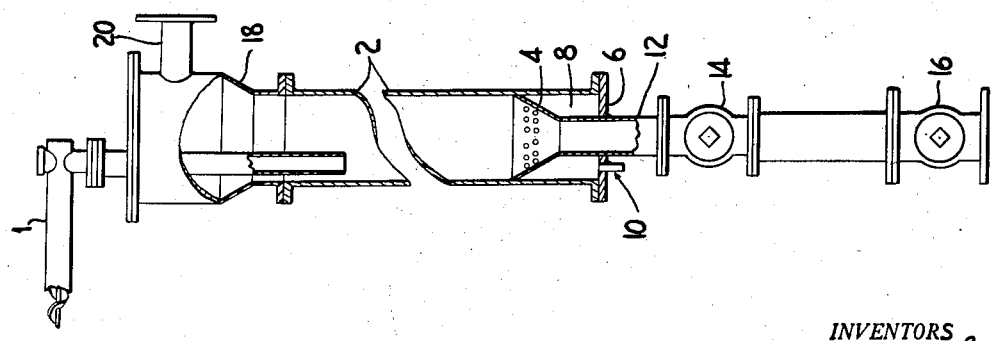

The accompanying drawing diagrammatically illustrates the manner in which the present invention may be conducted and illustrates embodiments in which:

Fig. 1 is a diagrammatic view, shown partially in vertical section, of an apparatus which is used for the calcination of barium carbonate and also for whitening of the resulting barium oxide; and Fig. 2 is a flow sheet showing the manner in which the calcination of barium carbonate and whitening of the resulting barium oxide is effected.

As shown in Fig. 1, the apparatus used for the calcination and whitening operation consists of a calciner 2 which is heated externally by conventional means (not shown). This tube is provided at its lower end with a conically shaped gas distributor 4 having perforations therein for transmission of fluidizing gas into the calciner 2. The tube is closed by bottom 6 thereby providing a gas chamber 8 which is supplied with fluidizing gas through inlet 10. The lower end of conical tube 4 terminates in a product outlet 12 which has suitable plug cocks 14 and 16 therein in order to permit withdrawal of product. The upper portion of the calciner 2 is provided with an enlarged section 18 having an outlet 20 for the gases leaving the system and a screw conveyor and inlet system 1 for introduction of granules of barium carbonate and carbon.

In the practice of the process for the calcination of barium carbonate, essentially anhydrous nitrogen or like inert gas in introduced into the calciner tube 2 through inlet 10 and the tube is heated to calcination temperature, normally ranging in the range of 825 to 1050° C. The best calcination temperature usually is approximately 925 to 975° C.

To initiate the process, barium oxide granules having a particle size ranging from 10 to 80 mesh, usually in the range of 14 to 30 mesh, are introduced into the calciner tube and the fluidizing gas is turned on and the tube is heated from the outside by any suitable method until the bed of fluidized barium oxide particles has been raised to calcination temperature. Thereafter, further barium carbonate-carbon granules normally containing 6 to 10 percent or more by weight of carbon, based upon the weight of the barium carbonate, are introduced into the fluidized bed continuously or periodically through the screw conveyor and feed line 1. As calcination proceeds, the calcined barium oxide is withdrawn periodically from the product line 12 by opening cocks 14 or 16. The process normally is conducted so that the retention time of the barium granules in the calciner is substantial, usually about 2 to 4 hours.

As a result of the above process, the barium carbonate is calcined and the granules flowing from the calciner normally contain in excess of 70 to 90 (usually over 90) percent barium oxide. These barium oxide granules are then placed in another unit having exactly the same structure as the calciner above described. In this process a stream of nitrogen or like inert gas containing small amounts of water vapor is introduced into the heating unit through inlet 10 and a bed of the barium oxide granules to be whitened is fluidized in the calciner. Normally this fluidized bed is established in an inert nitrogen atmosphere containing no water initially and the bed is brought up to temperature before introduction of water. Thereafter, the water is introduced into the vapor.

The process may be conducted either batchwise or continuously. If batchwise, then batches of the barium oxide granules are introduced into the heater and held at a temperature above 1000° F., usually in the range of 1500 to 2200° F. until properly whitened. If continuous, the bed is established and feed is introduced into the bed continuously or periodically through inlet 1, and the product is withdrawn through line 12, also either continuously or periodically.

In accordance with an effective method of accomplishing the result, a nitrogen stream containing small amounts of hydrogen, usually in the range of 0.1 to 3 percent by volume, is preheated and 0.1 to 5 percent by volume of oxygen is introduced into the stream. As a consequence, the water is generated in the nitrogen stream and the nitrogen containing the water vapor is then introduced through line 10. This is an effective method of controlling the amount of water vapor which is introduced into the heating unit.

Whereas humidification of nitrogen vapor can be effected, such humidification would normally tend to establish a nitrogen gas which is saturated as to water vapor at the particular temperature of humidification. On the other hand, by generating the water in situ, it is possible to control the amount of water in the nitrogen very conveniently simply by controlling the amount of gaseous oxygen introduced therein, so long as the hydrogen is present in amount sufficient to react with the oxygen. Furthermore, even if hydrogen is not in excess, the oxygen goes into the reaction mixture in small amounts and also serves to remove carbon by burning to evolve carbon monoxide.

Fig. 2 diagrammatically illustrates a convenient method of conducting this process. In the practice of the process as illustrated in Fig. 2, hot nitrogen containing a small amount of hydrogen, for example, 1½ percent hydrogen by volume, is introduced into line 52, and oxygen in amount, for example, of about ½ percent by volume, is introduced through line 54. The mixture is then introduced into the whitening unit 56 which has the structure illustrated in Fig. 1. The white product is withdrawn through line 58. The resulting gas, which is largely nitrogen but which contains a small amount of CO and gaseous hydrogen, is withdrawn through line 60 and is introduced into the bottom of calciner 66, also having the structure illustrated in Fig. 1. Barium carbonate granules are introduced into the calciner through line 74 and the barium oxide granules are withdrawn through line 68 and then introduced into the whitening apparatus through line 62. As a consequence, the nitrogen which is used to effect the whitening operation also is used to effect the calcination fluidization. This provides a material economic saving in the nitrogen required.

The following is an illustrative example of the manner in which the invention herein contemplated may be practiced:

Example I

The apparatus illustrated in Fig. 1 was used. In this test, the calcination reactor comprised a metal tube having an internal diameter of 8 inches.

In a typical operation, 100 parts by weight of finely divided barium carbonate having a particle size of minus 100 to plus 300 mesh, 7 parts by weight of carbon lampblack, and one part by weight of an aqueous paste of wheat starch, were mixed together using an amount of water sufficient to make a stiff plastic mass. The product was extruded through dies approximately ⅟₁₆ inch in diameter. The extruded product was baked for about 12 hours at a temperature of about 140° C. The resulting product comprised a plurality of particles approximately ⅟₁₆ inch in diameter and ranging from about ⅟₁₆ to ¼ inch in length.

These products were then cracked or mildly crushed, and the crushed product was screened to obtain a product ranging from minus 14 to plus 30 mesh in size.

In the calcination, nitrogen preheated to about 1610° F. was introduced into the bottom of the tube at a rate of 14 cubic feet per minute measured at standard conditions (760 millimeters pressure and 70° F.) and the tube was heated to 1800° F. A charge of previously calcined barium oxide granules was introduced to produce a fluidized bed of barium oxide granules about 3 feet in depth. During the run, the barium carbonate granules were fed into the nitrogen at a rate of about 30 to 50 pounds per hour while maintaining the temperature of the bed at about 1650 to 1750° F. and withdrawing calcined barium oxide at a rate of about 30 to 45 pounds per hour. This product contained 70 to 90 percent by weight of barium oxide. The rate of addition of granules was controlled to maintain the level of the fluid bed essentially constant.

Barium oxide granules prepared as above from a series of runs and containing from 70 to 90 percent BaO and 0.3 to 1.4 percent by weight of residual carbon were charged again into the tube described above. The bed was fluidized by introduction of nitrogen into the bed at a rate of 14 cubic feet per minute measured at standard conditions described above. The temperature of the bed was maintained at about 1700° F. and the batch was heated for 165 minutes. During the heating in this unit, nitrogen containing 1.5 percent by volume of hydrogen was used. To this nitrogen was added 0.26 percent by volume of oxygen. The resulting barium oxide which was produced contained in excess of 96–98 percent BaO and was white. It contained only traces of free carbon.

Example II

A batch of barium oxide granules prepared as in Example I and containing 80 percent by weight BaO and about 1 percent by weight of carbon is charged into a tube as in Example I and is heated as described in Example I at 1700° F. in a stream of nitrogen containing 0.25 percent water vapor by volume and free from other impurities for three hours. The barium oxide thus obtained contains 98 percent by weight of BaO.

It will be understood that while nitrogen has been described as the inert gas, various other gases conventionally known as the inert gases, such as helium, argon, and the like, may also be used if desired. Furthermore, other gases which are inert to barium oxide may be used. For example, elemental hydrogen is inert to barium oxide and therefore may be used as the inert gas containing water vapor, as herein contemplated. Moreover, gaseous hydrocarbons such as methane, propane, or like gas which reacts with oxygen to produce water may be used in lieu of hydrogen in the above examples and in the same proportions (0.1 to 5 percent by volume of the mixture of inert gas, oxygen and hydrocarbon).

Although the present invention has been described with reference to the specific details of certain embodiments, it is not intended that such embodiments shall be regarded as limitations upon the scope of the invention except insofar as included in the accompanying claims.

What is claimed:

1. A method of preparing essentially white barium oxide which comprises calcining a mixture of barium carbonate and carbon and thereby producing barium oxide discolored with carbon and thereafter in a separate operation removing the carbon by heating the mixture in a stream of an inert gas which contains a small amount of water vapor not substantially in excess of 5 percent by volume at a temperature above 1000° F.

2. A method of preparing essentially white barium oxide which comprises calcining a mixture of barium carbonate and carbon and thereby producing barium oxide discolored with carbon and thereafter in a separate operation removing the carbon by heating the mixture in a stream of an inert gas which contains a small amount of water vapor not substantially in excess of 5 percent by volume at a temperature of 1500 to 2300° F.

3. A method of removing carbon from a mixture of barium oxide and carbon, which mixture contains at least about 70 percent by weight barium oxide, which comprises heating the mixture in a stream of an inert gas which contains a small amount of water vapor not substantially in excess of 5 percent by volume at a temperature above about 1000° F.

4. The process of claim 1 wherein the amount of water vapor in the inert gas ranges from about 0.1 to 3 percent by volume based upon the total volume of inert gas and water vapor.

5. A method of preparing essentially white barium oxide which comprises calcining a mixture of barium carbonate and carbon and thereby producing barium oxide discolored with carbon and thereafter in a separate operation removing the carbon by heating the mixture in a stream of nitrogen which contains a small amount of water vapor not substantially in excess of 5 percent by volume at a temperature above 1000° F.

6. A method of preparing essentially white barium oxide which comprises calcining a mixture of barium carbonate and carbon and thereby producing barium oxide discolored with carbon and thereafter in a separate operation removing the carbon by heating the mixture in a stream of nitrogen which contains a small amount of water vapor not substantially in excess of 5 percent by volume at a temperature of 1500 to 2200° F.

7. A method of removing carbon from a mixture of barium oxide and carbon, which mixture contains at least about 70 percent barium oxide, which comprises heating the mixture in a stream of nitrogen which contains a small amount of water vapor not substantially in excess of 5 percent by volume at a temperature above 1000° F.

8. A method of removing carbon from a mixture of barium oxide and carbon, which mixture contains at least about 70 percent barium oxide, which comprises heating the mixture in a stream of inert gas which contains up to about 5 percent by volume of oxygen and up to about 3 percent by volume of a gas of the group consisting of hydrogen and hydrogen containing gases which react with oxygen to form water vapor.

9. A method of removing carbon from a mixture of barium oxide and carbon, which mixture contains at least 70 percent barium oxide, which comprises heating the mixture at a temperature above 1000° F. in a stream of nitrogen which contains a small amount up to about 5 percent by volume of oxygen and a small amount of hydrogen.

References Cited in the file of this patent
UNITED STATES PATENTS

| | | |
|---|---|---|
| 1,243,190 | Kremers | Oct. 16, 1917 |
| 1,305,618 | Pierce | June 3, 1919 |
| 1,947,952 | Nitzschke | Feb. 20, 1934 |
| 2,791,489 | Rahn | May 7, 1957 |

OTHER REFERENCES

McPherson and Henderson book "General Chemistry," 1927 ed., pp. 163, 164. Ginn and Co., N. Y.

UNITED STATES PATENT OFFICE
CERTIFICATE OF CORRECTION

Patent No. 2,876,073                                    March 3, 1959

Henry W. Rahn et al.

It is hereby certified that error appears in the printed specification of the above numbered patent requiring correction and that the said Letters Patent should read as corrected below.

Column 6, line 32, after "amount" insert -- up to about 3 percent by volume --.

Signed and sealed this 18th day of August 1959.

(SEAL)
Attest:

KARL H. AXLINE
Attesting Officer

ROBERT C. WATSON
Commissioner of Patents